United States Patent
Garg et al.

(10) Patent No.: US 11,919,819 B2
(45) Date of Patent: Mar. 5, 2024

(54) CERAMIC MATRIX COMPOSITE WITH INTERFACIAL COATING SYSTEM

(71) Applicant: RAYTHEON TECHNOLOGIES CORPORATION, Farmington, CT (US)

(72) Inventors: Nitin Garg, West Hartford, CT (US); Olivier H. Sudre, Glastonbury, CT (US); Cristal Chan, East Hampton, CT (US); John H. Shaw, West Hartford, CT (US); Ben Callaway, Hartford, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/861,417

(22) Filed: Jul. 11, 2022

(65) Prior Publication Data
US 2023/0029877 A1   Feb. 2, 2023

Related U.S. Application Data

(60) Provisional application No. 63/227,386, filed on Jul. 30, 2021.

(51) Int. Cl.
| | |
|---|---|
| *C04B 35/111* | (2006.01) |
| *C04B 24/12* | (2006.01) |
| *C04B 35/628* | (2006.01) |
| *C04B 35/80* | (2006.01) |
| *C04B 41/00* | (2006.01) |
| *F02C 7/00* | (2006.01) |

(52) U.S. Cl.
CPC ........ *C04B 35/80* (2013.01); *C04B 35/62868* (2013.01); *C04B 35/62873* (2013.01); *C04B 35/62894* (2013.01); *C04B 35/62897* (2013.01); *F02C 7/00* (2013.01); *C04B 2235/3826* (2013.01); *C04B 2235/5244* (2013.01); *F05D 2220/32* (2013.01); *F05D 2240/35* (2013.01); *F05D 2300/6033* (2013.01)

(58) Field of Classification Search
CPC ....... C04B 35/80; C04B 41/009; C04B 41/52; C04B 41/89; C04B 35/111; C04B 24/12
See application file for complete search history.

(56) References Cited

U.S. PATENT DOCUMENTS

| | | | |
|---|---|---|---|
| 5,455,106 | A | 10/1995 | Steffier |
| 6,322,889 | B1 | 11/2001 | Lara-Curzio et al. |
| (Continued) | | | |

FOREIGN PATENT DOCUMENTS

| | | | | |
|---|---|---|---|---|
| CN | 106431448 A | * | 2/2017 | .............. F04B 41/52 |
| CN | 106521435 A | * | 3/2017 | .............. A61L 27/06 |

OTHER PUBLICATIONS

English translation of CN-106521435 by PE2E May 2, 2023.*
English CN106431448 by PE2E Aug. 3, 2023.*

*Primary Examiner* — Deming Wan
(74) *Attorney, Agent, or Firm* — Carlson, Gaskey & Olds, P.C.

(57) ABSTRACT

A ceramic matrix composite includes a ceramic matrix, fibers embedded in the ceramic matrix, and an interfacial coating system on each of the fibers. The interfacial coating system includes alternating layers of boron nitride layers of individual thicknesses of about 50 nanometers to 200 nanometers and carbon layers of individual thicknesses of less than 5 nanometers.

15 Claims, 3 Drawing Sheets

(56) References Cited

U.S. PATENT DOCUMENTS

| | | | |
|---|---|---|---|
| 10,723,659 B2 * | 7/2020 | Shi | C04B 35/62884 |
| 11,014,856 B2 | 5/2021 | Delehouze et al. | |
| 2017/0313629 A1 * | 11/2017 | Shim | C04B 35/584 |
| 2020/0216365 A1 * | 7/2020 | Jackson | C04B 35/111 |

* cited by examiner

CERAMIC MATRIX COMPOSITE WITH INTERFACIAL COATING SYSTEM

CROSS-REFERENCE TO RELATED APPLICATION

The present disclosure claims priority to U.S. Provisional Application No. 63/227,386 filed Jul. 30, 2021.

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Airfoils and other components in the engine may be formed of a superalloy and may include thermal barrier coatings to extend temperature capability and lifetime. Ceramic matrix composite ("CMC") materials are also being considered. Among other attractive properties, CMCs have high temperature resistance. Despite this attribute, however, there are unique challenges to implementing CMCs.

SUMMARY

A ceramic matrix composite according to an example of the present disclosure includes a ceramic matrix, fibers embedded in the ceramic matrix, and an interfacial coating system on each of the fibers. The interfacial coating system has alternating layers of boron nitride layers of individual thicknesses of about 50 nanometers to 200 nanometers and carbon layers of individual thicknesses of less than 5 nanometers.

In a further embodiment of any of the foregoing embodiments, the boron nitride layers are of individual thickness of 50 nanometers to 100 nanometers.

In a further embodiment of any of the foregoing embodiments, there are from 4 to 10 of the alternating layers.

In a further embodiment of any of the foregoing embodiments, the alternating layers are compositionally graded.

In a further embodiment of any of the foregoing embodiments, the matrix and the fibers are silicon carbide.

In a further embodiment of any of the foregoing embodiments, the boron nitride layers have a morphology templated off of the carbon layers.

A gas turbine engine according to an example of the present disclosure includes a compressor section, a combustor in fluid communication with the compressor section, and a turbine section in fluid communication with the combustor. The turbine section has a turbine component that is formed of a ceramic matrix composite that has a ceramic matrix, fibers embedded in the ceramic matrix, and an interfacial coating system on each of the fibers. The interfacial coating system has alternating layers of boron nitride layers of individual thicknesses of about 50 nanometers to 200 nanometers and carbon layers of individual thicknesses of less than 5 nanometers.

In a further embodiment of any of the foregoing embodiments, the boron nitride layers are of individual thickness of 50 nanometers to 100 nanometers.

In a further embodiment of any of the foregoing embodiments, there are from 4 to 10 of the alternating layers.

In a further embodiment of any of the foregoing embodiments, the alternating layers are compositionally graded.

In a further embodiment of any of the foregoing embodiments, the matrix and the fibers are silicon carbide.

In a further embodiment of any of the foregoing embodiments, the boron nitride layers have a morphology templated off of the carbon layers.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
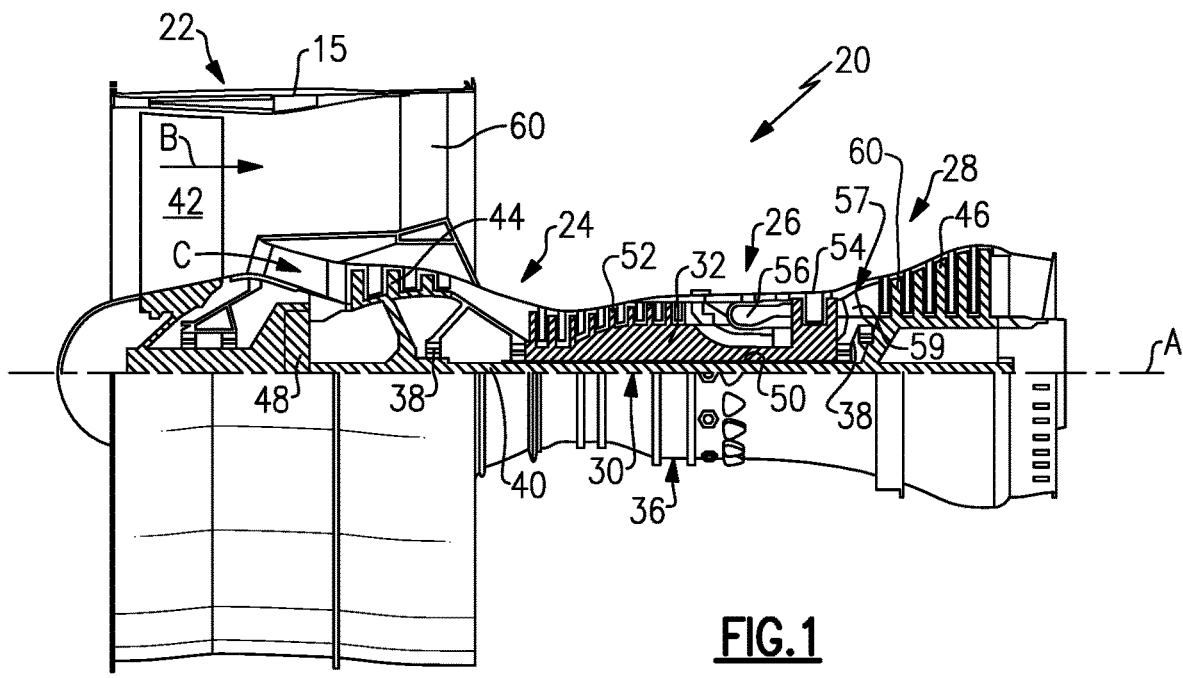
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
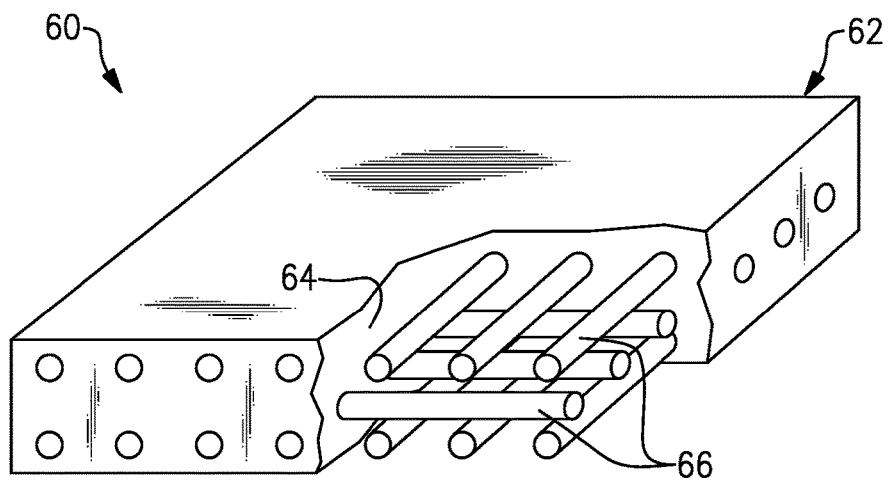
FIG. 2 illustrates a ceramic matrix composite.

FIG. 2 illustrates a representative portion of an engine component 60. As examples, the component 60 may be, but is not limited to, a vane, a blade, an outer air seal, or a combustor panel. As will be appreciated, although shown generically, the component 60 will be formed with the desired geometry to serve the function for which it is being implemented.

The component 60 is formed of a ceramic matrix composite (CMC) 62. The CMC 62 includes a matrix 64 and fibers 66 that are embedded in the matrix 64. A portion of the matrix 64 is cut away in the figure to reveal a greater extent of the fibers 66. In one example, the CMC 62 may be, but is not limited to, a SiC/SiC CMC in which SiC fiber tows are disposed within a SiC matrix. The fiber tows are arranged in a fiber architecture, which refers to an ordered arrangement of the tows relative to one another, such as a 2D woven ply (e.g. a braid, harness weave, etc.), unidirectional cross-plied, or a 3D structure. It is to be appreciated, however, that the CMC 62 is not particularly limited to SiC and that other CMCs will also benefit.

Figure 3:
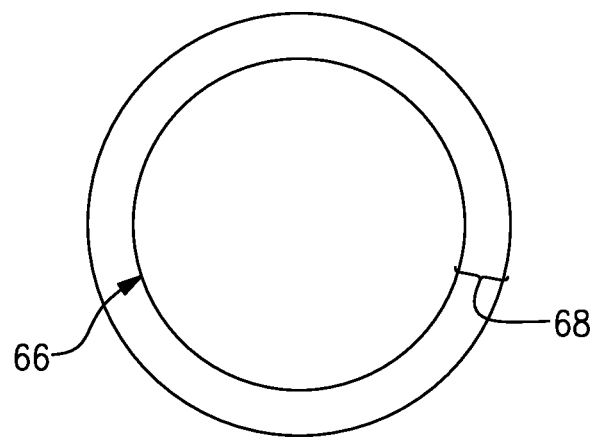
FIG. 3 illustrates a fiber and interfacial coating system.

FIG. 3 illustrates a representative one of the fibers 66. Disposed on each such fiber 66 is an interfacial coating system 68. The interfacial coating system 68 serves several purposes, including as an insulation barrier to shield the fiber 66 against ingress of oxygen, water, and other substances from the surrounding environment and as debonding layers for enhanced toughness.

Figure 4:
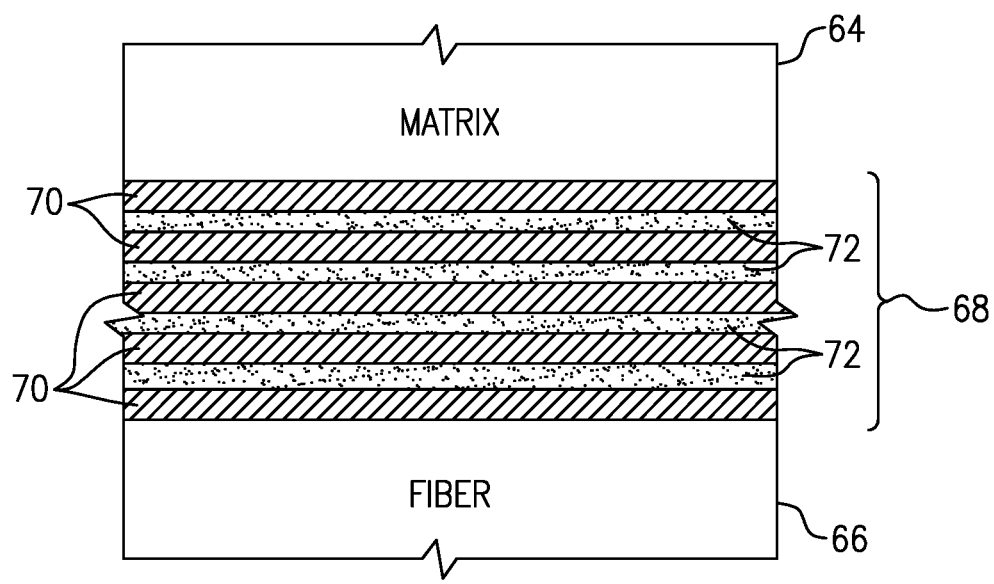
FIG. 4 illustrates the alternating layers of an interfacial coating system.

FIG. 4 illustrates a sectioned view through the interfacial coating system 68 and portions of the matrix 64 and the fiber 66. The interfacial coating system 68 includes alternating layers of boron nitride (layers 70) and carbon (layers 72). Each of the layers 70/72 is generally of uniform thickness along the length of the fiber 66. In the illustrated example, there are a total of 9 layers 70/72. In general, the interfacial coating system 68 will have from 4 to 10 total layers 70/72. The layers 70/72 are not shown to scale, but the individual carbon layers 72 are substantially thinner than the individual boron nitride layers 70. The boron nitride layers 70 are of individual thicknesses of about 50 nanometers to 200 nanometers, and the carbon layers 72 are of individual thicknesses of less than 5 nanometers.

The interfaces between the boron nitride layers 70 and the carbon layers 72 serve as relatively weak fault lines along which crack deflection and propagation can occur for enhanced toughness. The carbon layers 72 may also serve to capture oxygen by forming oxides with oxygen gas and/or moisture that infiltrates the CMC 62. The carbon layers 72 also serve as morphology templates during fabrication of the CMC 62. For instance, the carbon layers 72 are smooth and when the boron nitride is deposited onto the carbon, the boron nitride templates off of the smooth surface of the carbon to form an aligned morphology. For example, the carbon and the boron nitride have alternating layered structures. The layered structures align, permitting the layered structure of the boron nitride to template off of the layered structure of the carbon. The carbon and born nitride may be deposited by, but are not limited to, chemical vapor infiltration. In contrast, a turbostratic boron nitride has relatively high toughness and sliding stress, which does not favor crack deflection at the interface. To serve these purposes, the carbon layers 72 need not be very thick and, therefore, thicknesses greater than the above-prescribed amount are not needed and do not provide a corresponding greater benefit in these regards.

Figure 5:
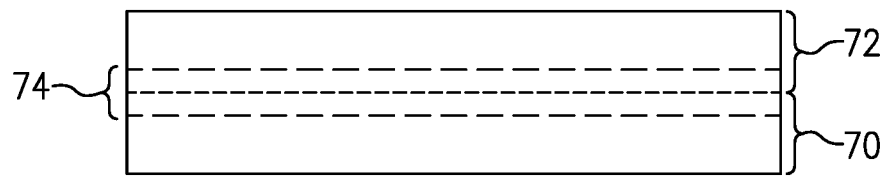
FIG. 5 illustrates compositionally graded layers of an interfacial coating system.

In the example of FIG. 4, the interfaces between the layers 70/72 are distinct in that the compositional profile changes in a single stepwise manner across the interface from 100% boron nitride to 100% carbon. In another example shown in FIG. 5, however, the layers 70/72 are compositionally graded. For instance, across the thickness of interfacial zone 74 the composition progressively changes from 100% boron nitride to a mix of boron nitride with some carbon, to a mix of carbon with some boron nitride, to 100% carbon. As an example, such a graded profile can be provided during fabrication by co-depositing boron nitride and carbon and changing the ratio between them as the coating builds-up.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A ceramic matrix composite comprising:
a ceramic matrix;
fibers embedded in the ceramic matrix; and
an interfacial coating system on each of the fibers, the interfacial coating system including alternating layers of boron nitride layers of individual thicknesses of about 50 nanometers to 200 nanometers and carbon layers of individual thicknesses of less than 5 nanometers.

2. The ceramic matrix composite as recited in claim 1, wherein the boron nitride layers are of individual thickness of 50 nanometers to 100 nanometers.

3. The ceramic matrix composite as recited in claim 1, wherein there are from 4 to 10 of the alternating layers.

4. The ceramic matrix composite as recited in claim 1, wherein the alternating layers are compositionally graded such that the interfacial coating system progressively changes from 100% boron nitride, to a mix of boron nitride with some carbon, to a mix of carbon with some boron nitride, to 100% carbon.

5. The ceramic matrix composite as recited in claim 1, wherein the matrix and the fibers are silicon carbide.

6. The ceramic matrix composite as recited in claim 1, wherein the boron nitride layers have a morphology templated off of the carbon layers.

7. The ceramic matrix composite as recited in claim 1, wherein the boron nitride layers are of individual thickness of 50 nanometers to 100 nanometers, there are from 4 to 10 of the alternating layers, and the matrix and the fibers are silicon carbide.

8. The ceramic matrix composite as recited in claim 1, wherein each of the fibers is individually circumscribed by the alternating layers of boron nitride layers and the carbon layers, and each of the boron nitride layers and each of the carbon layers are of uniform thickness along each of the fibers.

9. The ceramic matrix composite as recited in claim 1, wherein the carbon layers are 100% carbon.

10. A gas turbine engine comprising:
a compressor section;
a combustor in fluid communication with the compressor section; and
a turbine section in fluid communication with the combustor, the turbine section having a turbine component that is formed of a ceramic matrix composite that includes:
a ceramic matrix,
fibers embedded in the ceramic matrix, and
an interfacial coating system on each of the fibers, the interfacial coating system including alternating layers of boron nitride layers of individual thicknesses of about 50 nanometers to 200 nanometers and carbon layers of individual thicknesses of less than 5 nanometers.

11. The gas turbine engine as recited in claim 10, wherein the boron nitride layers are of individual thickness of 50 nanometers to 100 nanometers.

12. The gas turbine engine as recited in claim 10, wherein there are from 4 to 13 of the alternating layers.

13. The gas turbine engine as recited in claim 10, wherein the alternating layers are compositionally graded such that the interfacial coating system progressively changes from 100% boron nitride, to a mix of boron nitride with some carbon, to a mix of carbon with some boron nitride, to 100% carbon.

14. The gas turbine engine as recited in claim 10, wherein the matrix and the fibers are silicon carbide.

15. The gas turbine engine as recited in claim 10, wherein the boron nitride layers have a morphology templated off of the carbon layers.

* * * * *